United States Patent
Derrico et al.

(10) Patent No.: US 6,948,021 B2
(45) Date of Patent: Sep. 20, 2005

(54) CLUSTER COMPONENT NETWORK APPLIANCE SYSTEM AND METHOD FOR ENHANCING FAULT TOLERANCE AND HOT-SWAPPING

(75) Inventors: Joel Brian Derrico, Atlanta, GA (US); Paul Jonathan Freet, Duluth, GA (US)

(73) Assignee: Racemi Systems, Duluth, GA (US)

( * ) Notice: Subject to any disclaimer, the term of this patent is extended or adjusted under 35 U.S.C. 154(b) by 324 days.

(21) Appl. No.: 09/987,917

(22) Filed: Nov. 16, 2001

(65) Prior Publication Data

US 2002/0078290 A1 Jun. 20, 2002

Related U.S. Application Data

(60) Provisional application No. 60/248,834, filed on Nov. 16, 2000.

(51) Int. Cl.[7] .............................................. G06F 13/00
(52) U.S. Cl. ....................................... 710/302; 710/301
(58) Field of Search ................................ 710/301, 302, 710/72, 304, 100; 713/100; 709/222, 227, 219, 203, 223; 361/695, 720, 752, 683, 687; 363/123; 439/92; 307/46, 66; 370/910

(56) References Cited

U.S. PATENT DOCUMENTS

| | | | | |
|---|---|---|---|---|
| 5,033,112 A | * | 7/1991 | Bowling et al. | 398/110 |
| 5,161,097 A | * | 11/1992 | Ikeda | 363/124 |
| 5,555,510 A | * | 9/1996 | Verseput et al. | 710/302 |
| 6,421,777 B1 | * | 7/2002 | Pierre-Louis et al. | 713/2 |
| 6,452,797 B1 | * | 9/2002 | Konstad | 361/695 |
| 6,535,944 B1 | * | 3/2003 | Johari et al. | 710/302 |
| 6,591,324 B1 | * | 7/2003 | Chen et al. | 710/302 |

OTHER PUBLICATIONS

"Dynamic runtime re-scheduling allowing multiple implementations of a task for platform-based designs" by Tin-Man Lee; Henkel, J.; Wolf, W. (abstract only).*

"Redundant arrays of IDE drives" by Sanders, D.A.; Cremaldi, L.A.; Eschenburg, V>; Lawrence, C.N.; Riley, C.; Summers, D.J Petravick, D..L. (abstract only).*

* cited by examiner

Primary Examiner—Gopal C. Ray
(74) Attorney, Agent, or Firm—DLA Piper Rudnick Gray Cary US LLP

(57) ABSTRACT

Packaging a hot-swappable server module (server blade) in a computer network appliance with shared, hot-swappable power, network, and management modules to provide highly available computer capacity. Distributing power between hot-swappable modules using single DC input voltage.

36 Claims, 5 Drawing Sheets

CLUSTER COMPONENT NETWORK APPLIANCE SYSTEM AND METHOD FOR ENHANCING FAULT TOLERANCE AND HOT-SWAPPING

This application claims priority from U.S. Provisional Application Ser. No. 60/248,834, filed Nov. 16, 2000. The entirety of that provisional application is incorporated herein by reference.

BACKGROUND OF THE INVENTION

1. Field of the Invention

This invention generally relates to fault tolerant computer systems and, more specifically, to a system and method for enhancing fault tolerance and hot swapping in computer systems.

2. Related Art

Computer systems such as file servers and storage servers in computer networks are relied upon by large numbers of users. When a file server or storage server is out of operation, many users are inconvenienced. Thus, technology has been developed which supports maintenance and service of computer systems while they remain operational. One part of maintenance and service includes the replacement of components in the computer systems. "Hot swap" technology allows the replacement of components without turning off the power or resetting the computer system as a whole.

Hot swap enables the insertion and/or removal of components in a computer system while it is still active or operational. In systems that do not support hot swapping of components, each process of component insertion and/or removal requires a complete shutdown of the entire system to prevent damage to other components or to the system. In time critical systems such as communications systems, system downtime is both a financial problem as well as a service quality problem. That is, any downtime means a financial loss and disconnection of service to active lines.

A drawback of hot swapping, however, is it requires trained personnel to insert and/or remove components from a computer system to minimize damages caused by pitting connectors of the components against connectors of the computer system. Another drawback is electrical noise which can adversely affect the performance of the computer system. The noise is caused by the change in current at the instance when connection is made between power pins of a component and corresponding elements of the computer system. The result is voltage transients in the computer system backplane that may cause loss of data, incorrect program execution and damage to delicate hardware components.

Thus, there is a need for a system and method for enhancing fault tolerance and hot swapping in computer systems so as to reduce both the downtime of computer systems and the use of trained personnel to repair and/or maintain computer systems.

SUMMARY OF THE INVENTION

The present invention is directed to a hot swapping computer network appliance operating in mission critical applications where any computer downtime can result in serious consequences. The computer network appliance comprises a hot-swappable CPU module, a hot-swappable power module, a hot-swappable ethernet switch module and a backplane board having a plurality of hot swap mating connectors. Each of the CPU module, power module and ethernet switch module includes a hot swap connector for connecting with a specific hot swap mating connector of the backplane board. The computer network appliance further comprises a chassis providing physical support for the modules and the backplane board. The chassis comprises caddies providing air flow in the chassis. The chassis further comprises bays and slot guides to facilitate mounting and removal of the modules and to ensure proper alignment between the hot swap connectors of the modules and the hot swap mating connectors of the backplane board. The computer network appliance comprises a power connector and a data input/output connector, both of which remain connected during mounting or removal of the modules.

Each of the hot swap connectors of the modules comprises pin connections arranged in a specific pattern. The pins include ground pins, power pins and signal pins. The ground pins of a hot swap connector are connected first to corresponding ground elements of a hot swap mating connector, and the signal pins of the hot swap connector are connected last to corresponding signal elements of the hot swap mating connector so as to reduce brown outs in the computer network appliance.

The CPU module of the invention operates as a stand alone computer. The CPU module comprises hardware BIOS for configuring the CPU module and instructing a network attached storage (NAS) to locate an operating system (OS) from which to boot. The CPU module is configured to boot remotely from an OS located in the NAS without user intervention. This remote booting ability of the CPU module allows the CPU module to run different types of operating systems without the need for a local hard disk drive (HDD), which increases the mean time between failure (MTBF) and decreases the mean time to repair (MTTR) of the computer network appliance.

The invention further provides that each of the hot swap connectors of the modules includes an ethernet connection providing communications to all modules attached to the backplane board.

The power module of the invention comprises dual DC—DC converters that perform direct conversion of a facility DC voltage to voltages required for normal operation in the modules. Features of the DC—DC converters include: allowing the modules in the computer network appliance to accept DC power directly from a battery backup source without requiring power inverters; higher MTBF than a typical switched power supply; use less power and generate less heat than a typical switched power supply; and provide better efficiency than a typical switched power supply in converting an input voltage to desired operational voltages of the modules.

DETAILED DESCRIPTION OF THE PREFERRED EMBODIMENTS

The following detailed description presents a description of certain embodiments of the present invention. However, the present invention can be embodied in different ways as defined by the claims. In this description, reference is made to the drawings wherein like parts are designated with like numerals throughout.

Figure 1:
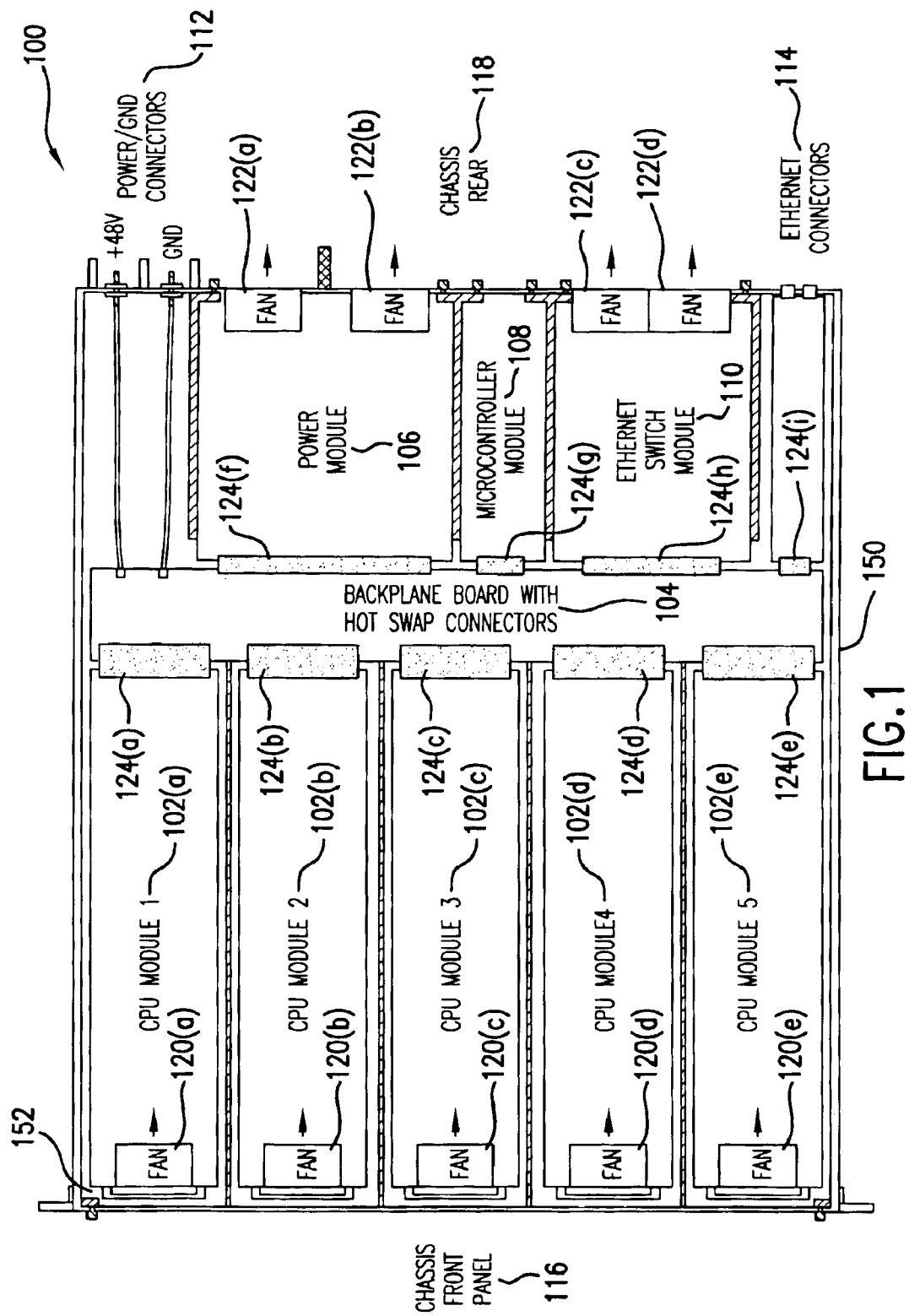
FIG. 1 is an illustration of a cluster computer network appliance arranged on a chassis in accordance with an embodiment of the invention.

FIG. 1 is an illustration of a cluster computer network appliance 100 arranged on a chassis 150 in accordance with an embodiment of the invention. The cluster computer network appliance 100 includes a plurality of CPU modules 102(a)–102(e), a passive backplane board 104 with hot swap mating connectors 124(a)–124(i), a power module 106, a microcontroller module 108, an ethernet switch module 110, power/ground connectors 112 and ethernet connectors 114. The cluster computer network appliance 100 fits in a 1.75" tall (1RU) metal chassis that fits in a standard 19" rack. The chassis 150 includes a fold down front panel 116 and supports the modules and backplane board of the invention. The chassis has five bays accessed via the front for inserting the CPU modules 102(a)–102(e) and three bays accessed via the rear 118 for inserting one each of the power module 106, the ethernet switch module 110 and the microcontroller module 108. Each module resides in a caddy 152 of the chassis such that when the module is inserted into the chassis the caddy ensures that the hot swap connectors are aligned. Each of the hot swap connectors used in the modules is specific to corresponding hot swap mating connectors in the backplane board. For normal operation, the chassis must be equipped with at least one CPU module, the power module and the ethernet switch module.

The power/ground connectors 112 provide physical connection for power to the chassis. The ethernet connectors 114 provide data input/output (I/O) to and from the chassis. Power is connected such that should the power module 106 fails, it may be replaced without disconnecting the actual power cabling inside the computer network appliance, which saves time and reduces complexity. Similarly, a failed ethernet switch module 110 may be replaced without disconnecting any of the power or data cables. Heat generated by active elements in each of the modules is dissipated using forced air flow from the front to the rear of the chassis using a push-pull method. Fans 120(a)–120(e) are provided for each CPU module providing a 1:1 ratio of fan to bay and positioned near the front panel 116 of the chassis to push outside air through the chassis. In the rear of the chassis, multiple fans 122(a)–122(d) are mated to the back of both the power module 106 and the ethernet switch module 110 to draw heated air out of the chassis.

Each module is designed to be hot swapped from the chassis such that there is no need for on/off switches on either the chassis or the modules. The passive backplane board 104 is equipped with hot swap mating connectors 124(a)–124(i) for each of the modules to be inserted into the computer network appliance. The chassis is installed and wired for power and data I/O such that power is supplied directly to a module as soon as it is inserted.

In order to avoid chassis power drains (brown outs) caused by instantaneous power short to ground through uncharged board capacitance, the hot swap connectors of the modules (shown in FIG. 1 mated to corresponding hot swap mating connectors 124(a)–124(i)) are designed to make pin connections in a specific pattern to avoid power drains. Each hot swap connector of a module comprises groups of pins (ground pins, pre-charge power pins, power pins and signal pins) of different length that allow the pins to make connections in a prearranged pattern. The first group of pins to make contact with corresponding elements in a mating connector on the passive backplane board is the ground pins (chassis ground and common ground). The next group of pins to make contact with corresponding elements in the mating connector is the pre-charge power pins. The pre-charge power pins connect to a power plane on a printed circuit board (PCB) through resistors to limit the flow of current while pre-charging the capacitance on the PCB. The next group of pins to make contact with corresponding elements in the mating connector is the power pins. The last group of pins to make contact with corresponding elements in the mating connector is the signal pins. By connecting the pins in this fashion, the computer network appliance of the invention avoids brown outs, arching across pins and false grounds that can damage components in the computer network appliance.

Figure 2:
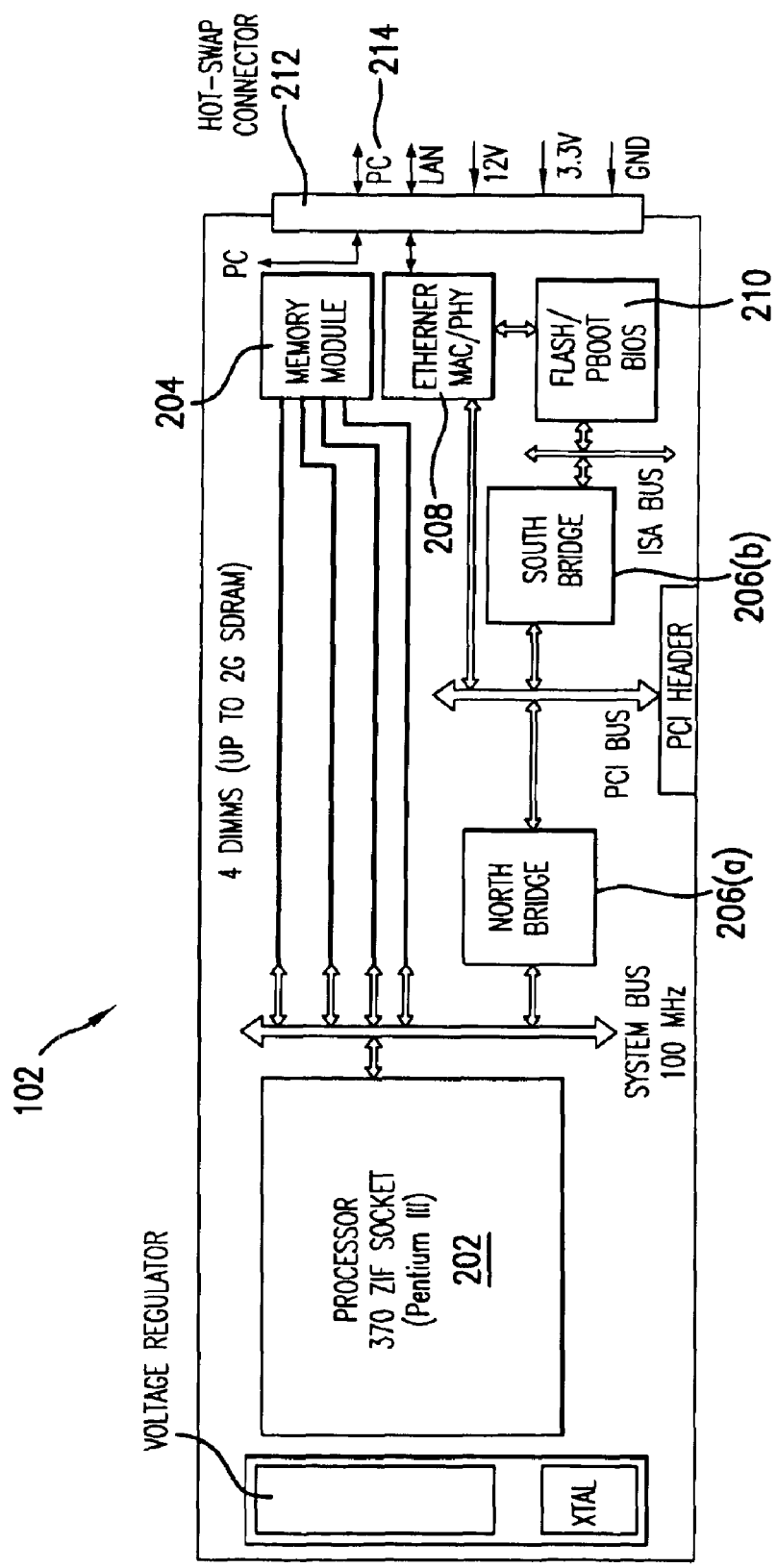
FIG. 2 is a block diagram of a CPU module in accordance with an embodiment of the invention.

FIG. 2 is a block diagram of a CPU module 102 in accordance with an embodiment of the invention. The CPU modules 102(a)–102(e) do not have moving parts and components defining a direct user interface. Each CPU module comprises a microprocessor 202, memory module 204, bus management chipset including a Northbridge chip 206(a) and a Southbridge chip 206(b), an ethernet interface chip 208, hardware BIOS 210 and a hot swap connector 212 mounted on a PCB. A PCI bus header is included for development and debugging purposes. Each CPU module functions as a stand alone computer.

The hardware BIOS 210 configures the CPU module for normal operation and instructs the ethernet interface chip 208 where to look on an NAS for the OS from which to boot. This remote boot capability of the CPU module enables the system administrator to direct the module to boot from a specific OS stored in a predetermined location in the NAS. This, in turn, enables the CPU modules in a network to run different types of OS (e.g., Unix, BSD, Linux, and Solaris) and removes the necessity for a local hard disk drive (HDD). Under management software control, a CPU module may be booted with an OS along with an "image" including several pre-installed applications (user defined quantity) stored in an NAS or a storage area network (SAN). This diskless booting of the CPU module allows the CPU to run different OS's and applications at different times. For example, a CPU module may be booted with a first OS and a first set of applications at one time and with a second OS and a second set of applications at another time. In another embodiment of the invention, different CPU modules operating in the same chassis may be booted with different OS's and different applications. In yet another embodiment of the invention, the same OS, applications and user data of one CPU module may be installed in another CPU module so as to provide for hot swapping of a failed CPU module or for installation of a redundant CPU module. Removal of the local HDD is a feature of the invention that allows hot swapping of the CPU modules without rebooting the system.

Once the OS is loaded on the CPU module and is operational, the health of the CPU module can be monitored using an I2C bus 214 that provides status information about the CPU module to the optional microcontroller module 108 as shown in FIG. 1. Along with information such as CPU temperature, fan RPM and voltage levels, a watchdog timer is provided in the hardware design to provide a way of determining if the OS is unstable or has crashed. If the OS is unstable or has crashed, then the microcontroller module 108 has the ability to remotely reset the CPU module 102 and log the failure. Such a reset can be configured to take place automatically or manually under the control of the administrator.

The CPU module 102 is configured to remotely boot without user intervention to allow for the removal of unnecessary user interface hardware such as video and standard I/O chipsets. The removal of this hardware and the HDD as described above reduces the complexity of the design and increases the mean time between failure (MTBF) of the hardware while simultaneously lowering the part count (cost) and power consumption of the module. In addition, the network mean time to repair (MTTR) is lowered through the use of the hot swap design and remote OS boot capability of the module because a failed unit can be removed and replaced rather easily and no user interaction is necessitated once a CPU module has been inserted into the chassis. A CPU module can be inserted in any of the bays in the front of the chassis.

Communications to and from each module is made using a standard fast ethernet connection rather than a complicated external bus structure. That is, a single ethernet connection via the hot swap connection of each module allows the module to communicate with other modules connected in the computer network appliance. The pinout of the hot swap connection is limited to ethernet signal path pins, dedicated power and ground pins, and an I2C bus for out-of-band monitoring of the health of the CPU module and remote rebooting of the microprocessor if the OS is determined to be unstable or have crashed. The process of out-of-band monitoring and control of the CPU module is mediated by the microcontroller module 108. In-band monitoring processes are used to load applications and data and are controlled by direct communications between the management software and the CPU module microprocessor 202.

As stated above, each CPU module includes a PCI bus header that is provided for debugging and test purposes only. If a CPU module is suspected of being faulty, then it can be removed and plugged into a test fixture that provides video, keyboard, mouse, and HDD access through a cable connection to the PCI bus header. Power and ethernet I/O are accessed through the hot swap connector 212. In this fashion, the CPU module combined with the test fixture emulates a desktop computer and the CPU module can be debugged accordingly.

Since only a limited number of modules make up the configuration of the computer network appliance, an end user's spare parts inventory is greatly reduced and configuration variability is low. Each module can be easily replaced and does not require a skilled person, and no spare parts need to be inventoried on-site and can be shipped overnight from the supplier. As a result, the computer network appliance MTTR is greatly reduced through the ease of module replacement and the MTBF is high through the simplified design of the CPU module.

A byproduct of using standard fast ethernet as the method of signal I/O for network communications is that heterogeneous CPU modules having different CPU speeds, memory space and bus chipsets may be mounted in the same chassis without affecting the operation of any other CPU module. Specifically, different generations of CPU modules may operate in the same chassis without requiring an update of existing modules.

Figure 3:
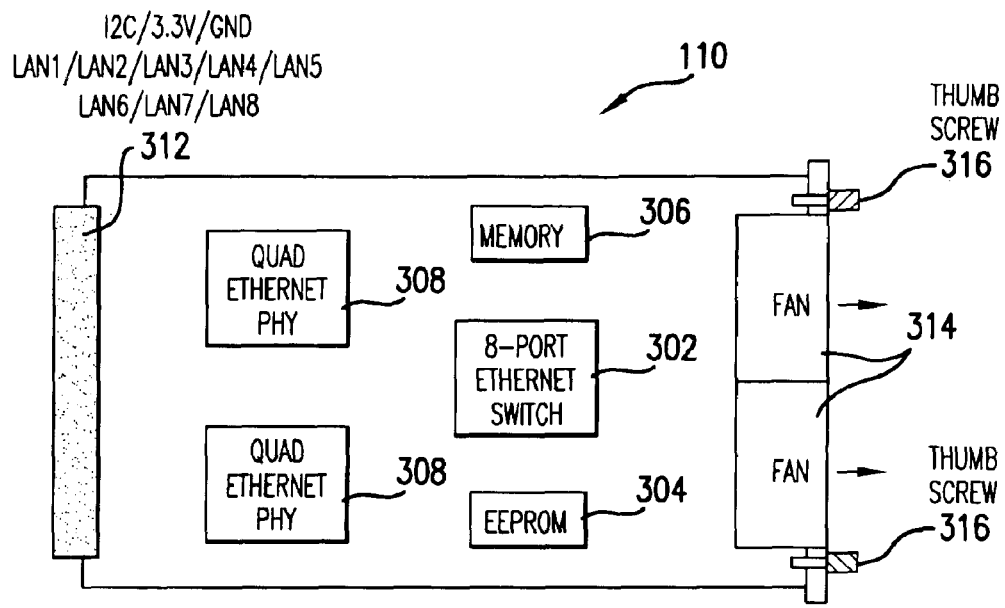
FIG. 3 illustrates an integrated ethernet switch module in accordance with an embodiment of the invention.

FIG. 3 illustrates an integrated ethernet switch module 110 in accordance with an embodiment of the invention. The ethernet switch module 110 comprises an ethernet switch 302, EEPROM 304, buffer memory 306, ethernet transceivers 308 and a hot swap connector 312 all mounted on a single PCB. In the preferred embodiment of the invention, the ethernet switch 302 is an unmanaged 8-port ethernet switch. The ethernet switch module 110 operates as a traffic cop for data communications in the computer network appliance, allowing each CPU module to communicate with other CPU modules in the same chassis. The ethernet switch module 110 further includes cooling fans 314 mounted to the rear of the PCB; the cooling fans 314 operate to draw heated air out of the chassis.

Once the ethernet switch module 110 is inserted into the rear of the chassis 150, it connects to the passive backplane board 104 via the hot swap connector 124(h) to derive power, establish ground and establish all ethernet connections within the computer network appliance. The ethernet switch module 110 is secured to the chassis using thumb screws 316 mounted on the 1RU panel. The ethernet switch module 110 is designed such that if a failure occurs, then the module can be quickly replaced without disconnecting any signal or power cables, thus attaining a low MTTR and allowing the use of less skilled maintenance personnel.

A function of the ethernet switch module 110 is to filter out inappropriate signal traffic so as to limit collisions caused by signal traffic in the computer network appliance. Communications between CPU modules in the same chassis occur without disruption to signal traffic between other CPU modules and the network and does not add to the overall level of network traffic. As a result, the efficiency of the signal bandwidth is increased without sacrificing performance or network cost.

Moreover, the application servers are not signal I/O limited and this allows all network traffic with the computer network appliance to be multiplexed over a switched fast ethernet (up to three connections) and does not require a direct ethernet connection between each CPU module and other modules in the computer network appliance. Consequently, the amount of external wiring required to connect the CPU modules to the computer network appliance is greatly reduced by integrating the switch into the design of the network server appliance. The use of multiple switched ethernet connections permits the computer network appliance to operate with different topologies or software configurations without additional hardware. Since five of the eight switched ethernet ports are dedicated to the five CPU module connections, a typical network connection would dedicate the remaining three ports to a mixture of NAS, network data I/O and an in-band appliance management channel.

Figure 4:
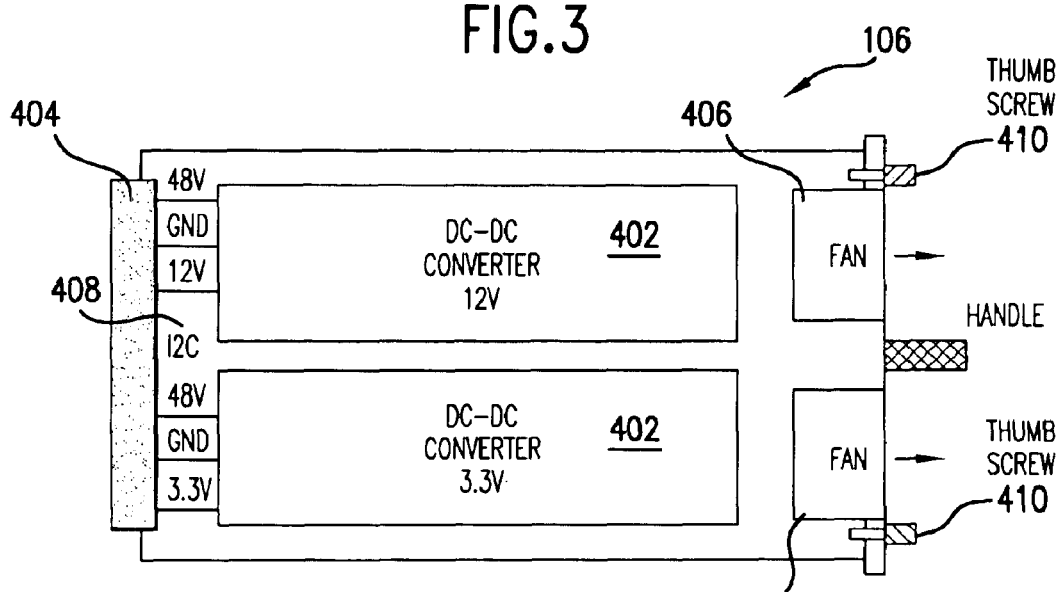
FIG. 4 illustrates a power module in accordance with an embodiment of the invention.

FIG. 4 illustrates the power module 106 in accordance with an embodiment of the invention. The power module 106 comprises dual DC—DC converters 402 mounted on a 1RU panel of a printed circuit board, a hot swap connector 404, cooling fans 406 and thumb screws 410. The DC—DC converters 402 perform direct conversion of a facility DC voltage (48V) to voltages required for normal operation of the modules that make up the computer network appliance. The hot swap connector 404 operates to draw facility voltage and supply operational voltages to the passive backplane board 104. The cooling fans 406 operate to draw air out of the chassis across the cooling fins of the heat sinks on the DC—DC converters 402.

Once the power module 106 is inserted into the rear of the chassis, it connects to the passive backplane board 104 via the hot swap connector 124(f) to derive facility DC power, establish ground and generate all operational voltages used by the other modules in the computer network appliance. The hot swap connector 404 includes an I2C bus 408 that is used to monitor the health of the power module. The power module is secured to the chassis using thumb screws 410. The power module is designed such that if a failure occurs, then the power module can be quickly replaced without disconnecting any power cables in the computer network appliance. As a result, the MTTR is lowered and less skilled maintenance personnel may be used.

In typical commercial electronics designs, the portion of the design having the lowest MTBF is the switched power supply. A common practice to overcome this drawback to increase the MTBF is to include redundant power supplies in a design so that if one power supply fails, then the redundant unit automatically backs it up. Because typical commercial electronics power supplies run on alternating current (AC) power, the battery backup system must convert power from its normal direct current (DC) state to AC using power inverters. Power inverters, however, are inefficient because of their fundamental operation (generator hysteresis) in converting power from DC to AC. Power inverters are also expensive and do not scale well should additional power capacity is required. Thus, designing an appliance using DC—DC converters instead of a switched AC power supply would allow an appliance to accept DC power directly from the battery backup source and negate the need for power inverters. That is, an appliance using DC—DC converters alone would not require use of expensive power inverters and increase the overall efficiency of the battery backup system. Another compelling reason to use DC—DC converters in a commercial electronics design is the MTBF of a DC—DC converter is much greater than that of a switched power supply. A DC—DC converter is also more efficient than a power supply in converting the input voltage to the desired operational voltages, which means that the appliance will use less power and generate less heat than a power supply.

Figure 5:
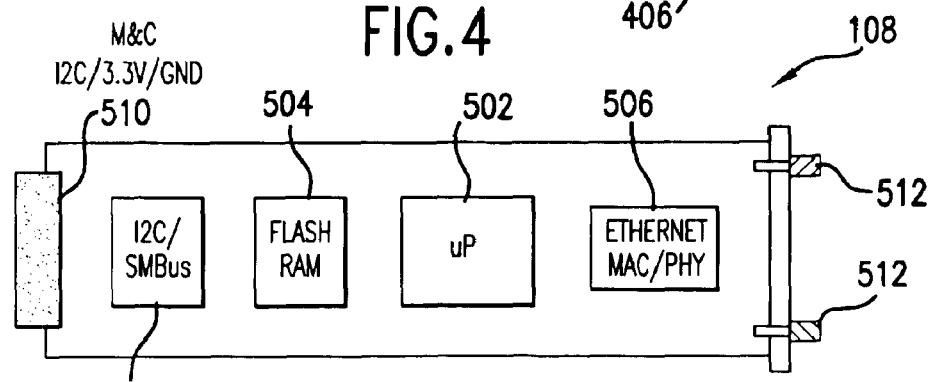
FIG. 5 illustrates a microcontroller module in accordance with an embodiment of the invention.

FIG. 5 illustrates a microcontroller module 108 in accordance with an embodiment of the invention. The microcontroller module 108 is optional and is not required for normal operation; the microcontroller module 108 is employed for monitoring out-of-band communications and for controlling the computer network appliance modules. The microcontroller module 108 comprises a stand-alone microprocessor 502 running an embedded OS, flash RAM 504 including the OS and application software, a dedicated ethernet chip 506 providing connection to the network, an I2C bus chipset 508, a hot swap connector 510 and thumb screws 512.

Once the microcontroller module is inserted into the rear of the chassis, it connects to the passive backplane board 104 via the hot swap connector 124(g) to derive power, establish ground and establish ethernet connection with the computer network appliance. The microcontroller module 108 is secured to the chassis using thumb screws 512 mounted on a 1RU at the rear of the module. The microcontroller module is designed such that if a failure occurs, then the microcontroller module can be quickly replaced without disconnecting any signal or power cables so as to attain a low MTTR and to use less skilled maintenance personnel.

The microcontroller module uses a dedicated ethernet path separate from the network data I/O to remotely poll the health of the power module 106, the ethernet switch module 108 and the CPU modules 102(a)–102(e). The microcontroller module communicates with other modules using an I2C bus that gathers status information, logs the results and provides the log to the management software either actively (should a failure is detected) or as part of a routine poll. The microcontroller module 108 also gathers information relating to the voltage levels, CPU temperatures, fan RPMs and CPU module OS stability. In addition, the microcontroller module has the ability to perform a remote reset of a CPU module if the OS of the module is determined to be unstable or have crashed. If the integrated ethernet switch fails, then the dedicated ethernet path may still be able to pinpoint the failure and differentiate the failure of the switch from an overall failure of the chassis. The dedicated ethernet path further informs the system administrator of the failure so as to facilitate a timely fix of the switch or a module on the computer network appliance.

Figure 6:
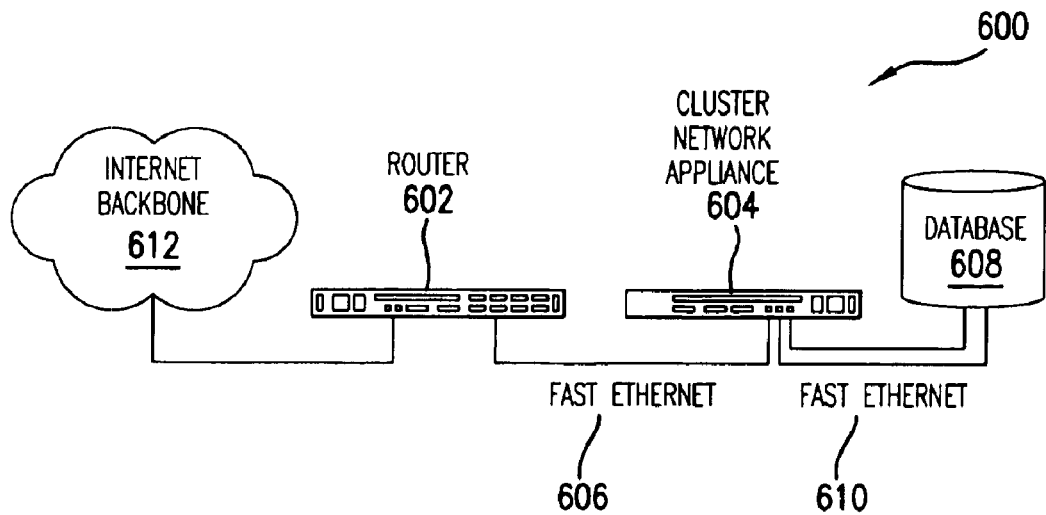
FIG. 6 illustrates an integration of a cluster computer network appliance, data storage device and standard internet access hardware.

FIG. 6 illustrates a system 600 integrating a computer network appliance, a data storage device and standard internet access hardware. The system 600 comprises a router 602, a computer network appliance 604 connected to the router 602 via a fast ethernet connection 606, network database 608 connected to the computer network appliance 604 via a fast ethernet connection 610, and internet backbone 612. Data switching is performed in the computer network appliance 604. This simplistic representation provides a framework for more sophisticated forms of clustering configurations based upon specific design criteria, such as availability and fault tolerance.

Figure 7:
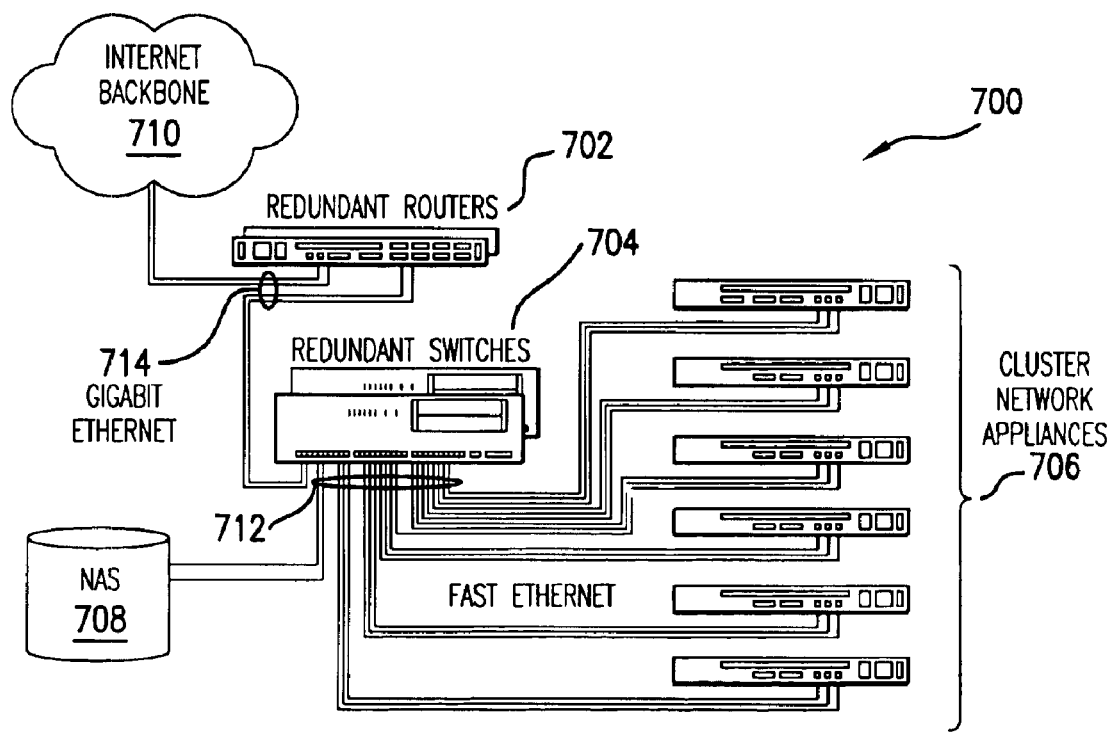
FIG. 7 illustrates a computer system utilizing multiple network appliances, redundant storage and internet access points.

FIG. 7 illustrates a system 700 integrating multiple computer network appliances, a storage device and redundant internet access hardware. The system 700 comprises a plurality of routers 702, a plurality of redundant switches 704, a plurality or cluster of computer network appliances 706, NAS 708 and internet backbone 710. Routers 702, computer network appliances 706 and NAS 708 are connected to redundant switches 704 by fast ethernet connection 712. A feature of system 700 is the system layer remains flat in that access to the routers, network appliances and NAS are all wired through the redundant switches 704. The system 700 provides a simple and easy to install/maintain framework for redundant network cabling by minimizing the amount of equipment external to the cluster of computer network appliances. In order to handle the increased traffic associated with the large number of servers in the cluster of computer network appliances, redundant gigabit ethernet paths 714 are introduced to connect internet backbone 710 and redundant switches 704 to redundant routers 702 as illustrated in FIG. 7.

Figure 8:
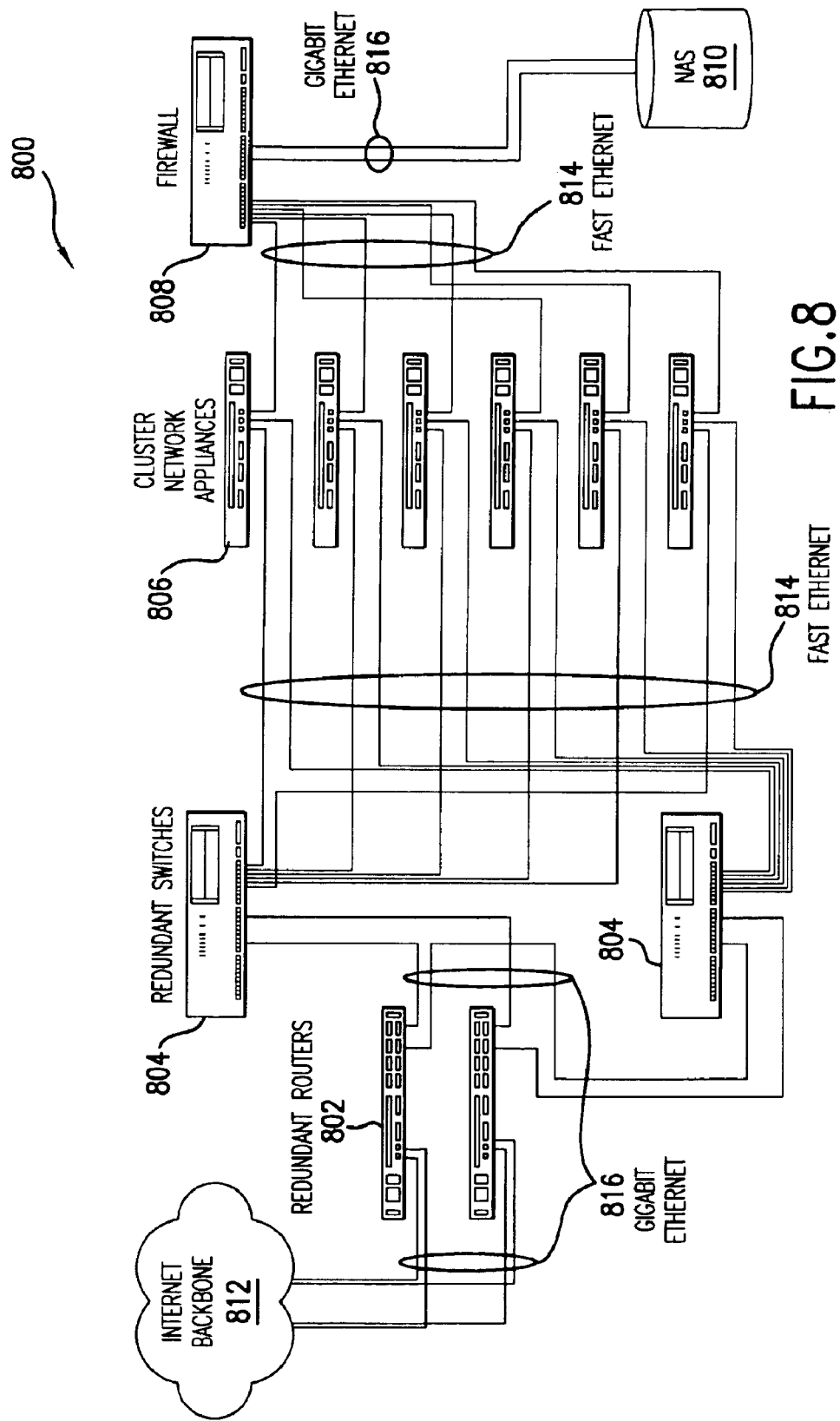
FIG. 8 illustrates a computer system providing path redundancy and equipment redundancy to achieve high availability.

Alternate forms of configurations can be generated to add other requirements to the system such as high availability and database security. FIG. 8 illustrates a system 800 providing path redundancy and equipment redundancy to achieve high availability. The system 800 comprises 800 a plurality of routers 802, a plurality of redundant switches 804, a plurality of cluster computer network appliances 806, a firewall 808, NAS 810 and internet backbone 812. Redundant switches 804 and firewall 808 are connected to cluster computer network appliances 806 by fast ethernet connection 814. Firewall 808 secures NAS 810 from direct access of internet connection by accepting only secure connections. The increased traffic associated with the large number of servers in the cluster of computer network appliances is addressed by introducing redundant gigabit ethernet paths 816 as the front-end connection between internet backbone 812 and redundant routers 802 and between redundant routers 802 and redundant switches 804, and as the back-end connection between firewall 808 and NAS 810.

What is claimed is:

1. A computer network appliance, comprising:
   a plurality of hot-swappable CPU modules, wherein each CPU module is a stand-alone independently-functioning computer;
   a hot-swappable power module;
   a hot-swappable ethernet switch module; and
   a backplane board having a plurality of hot swap mating connectors,
   wherein the at least one backplane board interconnects each of the CPU modules with the at least one power module and the at least one ethernet switch module, such that the at least one power module and the at least one ethernet switch module can be used as a shared resource by the plurality of CPU modules.

2. The computer network appliance of claim 1, further comprising a chassis providing physical support for a CPU module, the power module, the ethernet switch module and the backplane board.

3. The computer network appliance of claim 2, wherein the chassis comprises caddies providing air flow from the front to the rear of the chassis.

4. The computer network appliance of claim 2, wherein the chassis comprises bays and slot guides to facilitate mounting and removal of the modules and to ensure proper alignment between hot swap connectors of the modules and the hot swap mating connectors of the backplane board.

5. The computer network appliance of claim 2, wherein the modules and the chassis are free of on/off switches.

6. The computer network appliance of claim 1, further comprising a power connector and a data input/output connector.

7. The computer network appliance of claim 6, wherein the data input/output connector is a standard ethernet connector allowing heterogeneous CPU modules of differing CPU architectures mounted on a same chassis to communicate with each other.

8. The computer network appliance of claim 1, wherein each of the hot swap connectors of the modules comprises pin connections arranged in a specific pattern and includes ground pins, pre-charge power pins, power pins and signal pins.

9. The computer network appliance of claim 8, wherein the ground pins of a hot swap connector of a module make contact with corresponding ground elements of a hot swap mating connector of the backplane board.

10. The computer network appliance of claim 9, wherein pre-charge power pins of the hot swap connector of the module make contact with corresponding pre-charge power elements of the hot swap mating connector of the backplane board after the ground pins have made contact.

11. The computer network appliance of claim 10, wherein the power pins of the hot swap connector of the module make contact with corresponding power elements of the hot swap mating connector of the backplane board after the pre-charge power pins have made contact.

12. The computer network appliance of claim 11, wherein signal pins of the hot swap connector of the module make contact with corresponding signal elements of the hot swap mating connector of the backplane board after the power pins have made contact.

13. The computer network appliance of claim 1, wherein a CPU module operates as a stand alone computer.

14. The computer network appliance of claim 1, wherein a CPU module comprises hardware BIOS for configuring the CPU module and instructing a network attached storage (NAS) to locate an operating system (OS) from which to boot.

15. The computer network appliance of claim 1, wherein a CPU module is configured to boot remotely from an OS located in an NAS, and wherein the computer network appliance is free of a local hard disk drive (HDD).

16. The computer network appliance of claim 15, wherein remote booting of a CPU module allows the CPU module to run different types of operating systems.

17. The computer network appliance of claim 15, wherein effects of a lack of a local HDD include increased mean time between failure (MTBF) and decreased mean time to repair (MTTR) of the computer network appliance.

18. The computer network appliance of claim 1, wherein each of a plurality of hot swap connectors of the modules includes an ethernet connection providing communications to all modules attached to the backplane board.

19. The computer network appliance of claim 18, wherein an ethernet connection is a switched fast ethernet connection.

20. A computer network appliance comprising:
   a hot-swappable CPU module;
   a hot-swappable power module;
   a hot-swappable ethernet switch module; and
   a backplane board having a plurality of hot swap mating connectors; and
   a microcontroller module and a dedicated ethernet path, wherein the dedicated ethernet path is separate from a switched fast ethernet connection and provides the microcontroller module with a connection to remotely poll the CPU module, the power module and the ethernet switch module;
   wherein each of the CPU module, the power module and the ethernet switch module includes a hot swap connector for connecting with a specific hot swap mating connector of the backplane board.

21. The computer network appliance of claim 20, wherein the dedicated ethernet path is an I2C bus.

22. The computer network appliance of claim 20, wherein the microcontroller module polls the CPU module on the status of an OS.

23. The computer network appliance of claim 22, wherein the microcontroller module performs a remote reset of the CPU module if the OS of the CPU module is determined to be unstable or have crashed.

24. A computer network appliance, comprising:
   a hot-swappable CPU module;
   a hot-swappable power module;
   a hot-swappable ethernet switch module; and
   a backplane board having a plurality of hot swap mating connectors;
   wherein each of the CPU module, the power module and the ethernet switch module includes a hot swap connector for connecting with a specific hot swap mating connector of the backplane board;
   wherein the ethernet switch module filters communications internal and external to the computer network appliance to limit collisions caused by communications traffic.

25. The computer network appliance of claim 18, wherein different software configurations are used in CPU modules free of additional hardware.

26. The computer network appliance of claim 1, wherein the power module comprises dual DC—DC converters performing direct conversion of a facility DC voltage to voltages required for normal operation in the modules.

27. The computer network appliance of claim 26, wherein the DC—DC converters allow the modules to accept DC power directly from a battery backup source free of power inverters.

28. The computer network appliance of claim 26, wherein effects of using the DC—DC converters in the power module include increased MTBF and decreased MTTR in the computer network appliance as compared to a similar computer network appliance using a switched power supply.

29. The computer network appliance of claim 26, wherein the computer network appliance uses less power and generates less heat due to the use of the DC—DC converters in the power module as compared to a similar computer network appliance using a switched power supply.

30. A method of mounting a plurality of hot-swappable CPU modules in a computer network appliance, wherein each CPU module is an independently-functioning stand-alone computer, each CPU module comprising a hot swap connector including ground pins, power pins and signal pins, the computer network appliance including a backplane board having hot swap mating connectors, the method comprising:

connecting the ground pins of the hot swap connector with corresponding ground elements of a hot swap mating connector of the backplane board;

connecting the power pins of the hot swap connector with corresponding power elements of the hot swap mating connector of the backplane board after the ground pins have made contact; and connecting the signal pins of the hot swap connector of the module with corresponding signal elements of the hot swap mating connector of the backplane board after the power pins have made contact;

wherein a backplane board interconnects each of the CPU modules with the ground elements, power elements, and signal elements, such that the power module and the ethernet switch module can be used as a shared resource by the plurality of CPU modules.

31. The method of claim 30, wherein connecting the ground pins first and the signal pins last reduce brown outs in the computer network appliance.

32. A method of interconnecting a plurality of hot swapping CPU modules in a computer network appliance, wherein each CPU module is an independently-functioning computer, comprising (1) a chassis having a plurality of bays for different modules, (2) a backplane board having a plurality of mating connectors, (3) a power connector and (4) a data input/output connector, the method comprising:

placing a module having a hot swap connector in a corresponding bay of the chassis; and inserting the module into the chassis by connecting the hot swap connector with a mating connector of the backplane board, wherein the power connector and the data input/output connector remain connected in the computer network appliance during mounting of the module such that the power connector and the data input/output connector can be used as a shared resource by the plurality of CPU modules.

33. The method of claim 32, further comprising removing the module from the chassis by disconnecting the hot swap connector from the mating connector of the backplane board, wherein the power connector and the data input/output connector remain connected in the computer network appliance during removal of the module.

34. The method of claim 30, further comprising remotely booting a CPU module in a computer network appliance, comprising:

locating an OS in an NAS to boot the CPU module; and remotely booting the CPU module using the located OS;

wherein the computer network appliance is free of a local HDD in remotely booting the CPU module.

35. The method of claim 34, wherein the remote booting of the CPU module allows the CPU module to run different types of operating systems.

36. The method of claim 34, wherein effects of a lack of a local HDD include increased MTBF and decreased MTTR of the computer network appliance.

* * * * *